United States Patent
Tachibana et al.

(10) Patent No.: US 9,318,985 B2
(45) Date of Patent: Apr. 19, 2016

(54) IMAGE FORMING APPARATUS INCLUDING MOTOR THAT DRIVES IMAGE FORMING APPARATUS, CONTROLLER THAT CONTROLS MOTOR, AND SENSOR

(75) Inventors: Yuta Tachibana, Toyokawa (JP); Yuji Kobayashi, Toyohashi (JP); Hiroshi Yamaguchi, Toyokawa (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 183 days.

(21) Appl. No.: 13/472,824

(22) Filed: May 16, 2012

(65) Prior Publication Data
US 2012/0293097 A1 Nov. 22, 2012

(30) Foreign Application Priority Data
May 20, 2011 (JP) ................................ 2011-113230

(51) Int. Cl.
*H02P 6/06* (2006.01)

(52) U.S. Cl.
CPC ........................................ *H02P 6/06* (2013.01)

(58) Field of Classification Search
CPC ............... H02P 6/06; H02P 6/14; H02P 6/16; H03M 1/22; G03G 21/14
USPC ................. 318/700, 400.06, 560, 561; 341/8; 320/104
See application file for complete search history.

(56) References Cited

U.S. PATENT DOCUMENTS

| 2002/0021232 A1 | 2/2002 | Shoji et al. |
| 2004/0051499 A1 | 3/2004 | Kameda et al. |
| 2006/0241794 A1* | 10/2006 | Burkatovsky ...... G05B 19/0423 700/87 |

FOREIGN PATENT DOCUMENTS

| JP | 4-331488 A | 11/1992 |
| JP | 05-115194 A | 5/1993 |
| JP | 05115194 A * | 5/1993 |
| JP | 5-207775 A | 8/1993 |
| JP | 5-260783 A | 10/1993 |
| JP | 8-168283 A | 6/1996 |
| JP | 08168283 A * | 6/1996 |

(Continued)

OTHER PUBLICATIONS

Office Action (Notice of Grounds of Rejection) issued on Jun. 18, 2013, by the Japanese Patent Office in corresponding Japanese Patent Application No. 2011-113230, and an English Translation of the Office Action. (6 pages).

*Primary Examiner* — Paul Ip
*Assistant Examiner* — Said Bouziane
(74) *Attorney, Agent, or Firm* — Buchanan Ingersoll & Rooney PC

(57) ABSTRACT

An image forming apparatus includes a longitudinally conveying motor, a main-body-side control board, and a sensor. In the longitudinally conveying motor, an encoder generates an encoder signal having a frequency corresponding to the number of rotations of the longitudinally conveying motor, and a sensor signal superimposing unit receives an input of a logical state of the sensor. The sensor signal superimposing unit superimposes the logical state of the sensor on the encoder signal by modulating a duty ratio of the encoder signal based on the logical state of the sensor, and outputs a post-superimposition encoder signal. In the main-body-side control board, a sensor signal separating unit obtains the logical state of the sensor by demodulating the input encoder signal.

21 Claims, 10 Drawing Sheets

(56) References Cited

FOREIGN PATENT DOCUMENTS

| JP | 2002-034274 A | | 1/2002 |
| JP | 2003-018874 A | | 1/2003 |
| JP | 2005-062951 A | | 3/2005 |
| JP | 2007-082360 A | | 3/2007 |
| JP | 2007082360 A | * | 3/2007 |
| JP | 2010-008591 A | | 1/2010 |
| JP | 2010008591 A | * | 1/2010 |

* cited by examiner

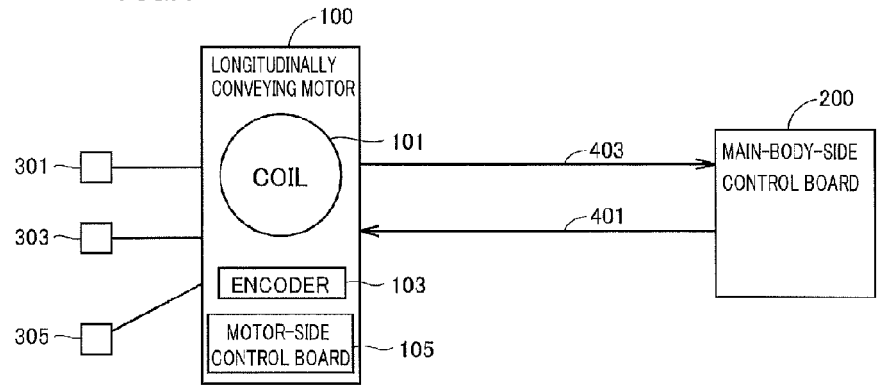
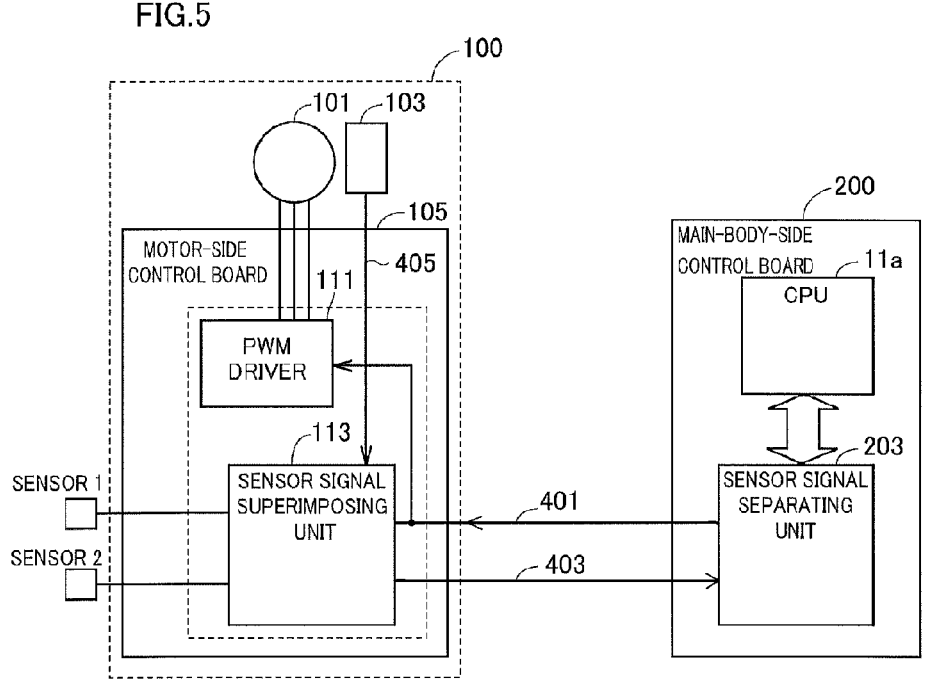

IMAGE FORMING APPARATUS INCLUDING MOTOR THAT DRIVES IMAGE FORMING APPARATUS, CONTROLLER THAT CONTROLS MOTOR, AND SENSOR

This application is based on Japanese Patent Application No. 2011-113230 filed with the Japan Patent Office on May 20, 2011, the entire content of which is hereby incorporated by reference.

BACKGROUND OF THE INVENTION

1. Field of the Invention

The present invention relates to an image forming apparatus, more particularly to an image forming apparatus including a motor that drives the image forming apparatus, a controller that controls the motor, and a sensor.

2. Description of the Background Art

Examples of an electrophotographic image forming apparatus include an MFP (Multi Function Peripheral) including a scanner function, a facsimile function, a copying function, a printer function, a data communication function, and a server function, a facsimile machine, a copying machine, and a printer. Frequently the image forming apparatus includes a manipulation panel including a display unit and an input unit.

Many sensors are mounted on the image forming apparatus in order to detect a sheet conveyed in the image forming apparatus at each point, a position of a movable member, a state of an openable cover (door), or a size of the sheet disposed in a sheet cassette. Conventionally, in order to detect the states of the sensors, each sensor and a control board are connected by a wire.

Documents 1 to 6 disclose a technology of decreasing the number of wires in the image forming apparatus. Document 1 discloses a technology in which a pulse indicating the number of rotations of a servo motor measured by an encoder is converted into a position signal of an (high-frequency) alternating current, superimposed on a power-supply line, and extracted on a controller side. In Document 1, the number of rotations of the servo motor measured by the encoder is converted into the high-frequency AC signal.

Document 2 discloses a motor control device including a motor driver, a motor position detector, and a power cable through which an electric power is supplied from the motor driver to the motor position detector. The motor position detector encodes parallel information on the motor position into serial information, and transmits the encoded serial information to the motor driver through a coupling circuit using the power cable. The motor driver receives the serial information from the coupling circuit, decodes the serial information into the parallel information, and drives a motor based on the parallel information.

Document 3 discloses a technology of reducing an influence of a noise by conducting communication between edges of a PWM (Pulse Width Modulation) signal.

Document 4 discloses a technology in which an encoder that outputs A-phase, B-phase, and Z-phase pulse signals and a controller are connected through two signal lines to superimpose the Z-phase pulse signal on the A-phase and B-phase pulse signals.

Document 5 discloses a technology, in which A-phase, B-phase, and Z-phase encoder signals are transmitted while an amplitude modulation is performed to the A-phase, B-phase, and Z-phase encoder signals using U-phase, V-phase, and W-phase magnetic pole signals.

Document 6 discloses a technology of superimposing U-phase, V-phase, and W-phase magnetic-pole-position signals on a Z-phase origin signal in an encoder attached to a synchronous type AC motor in which a rotor is constructed by a permanent magnet.

Document 1: Japanese Patent Laying-Open No. 8-168283
Document 2: Japanese Patent Laying-Open No. 2003-18874 (U.S. Pat. No. 3,702,828)
Document 3: Japanese Patent Laying-Open No. 2005-62951
Document 4: Japanese Patent Laying-Open No. 5-260783
Document 5: Japanese Patent Laying-Open No. 5-207775
Document 6: Japanese Patent Laying-Open No. 4-331488

Because the many sensors are mounted on the conventional image forming apparatus, a wiring route becomes complicated between each sensor and the control board, and a space is required to ensure the wiring route in the image forming apparatus. A connector is required on a control board in order to connect each wire to the control board, which enlarges a size of the control board. In recent years, there has been an increasing demand for downsizing of the image forming apparatus. However, the space for the wiring and the connector on the control board prevent the downsizing of the image forming apparatus.

Additionally, numerous sensors and wires are required in a medium-size or large-size image forming apparatus that are particularly used in an office. Therefore, unfortunately, it takes a long time to assemble the image forming apparatus, and the connector is possibly connected to a wrong point to generate a connection failure of the connector. As a result, unfortunately, assembly work and maintenance work are inefficient, and an assembly cost and a maintenance cost (service cost) are increased.

In the technologies disclosed in Patent Documents 1 to 3, in which the motor signal is superimposed on the power-supply line while modulated, a circuit that processes the analog high-frequency signal is required on not only the motor side but also the control board side. Therefore, a structure is complicated and high cost. Because an interface for the motor signal is specially configured, a degree of freedom of motor selection is significantly decreased. The motor used in the technologies disclosed in Patent Documents 1 to 3 is frequently incompatible with a small-size image forming apparatus in which a mechanism reducing a wiring amount is not required because of the relatively small wiring amount, and therefore the motor cannot be applied in the small-size image forming apparatus. The above problem cannot be solved by the technologies disclosed in Patent Documents 4 to 6.

SUMMARY OF THE INVENTION

An object of the invention is to provide an image forming apparatus that can achieve the downsizing thereof.

Another object of the invention is to provide an image forming apparatus that facilitates the assembly work and the maintenance.

An image forming apparatus according to an aspect of the invention includes: a motor for driving the image forming apparatus; a controller for controlling the motor; and a sensor, wherein the motor includes: pulse generating unit for generating a pulse signal string having a frequency corresponding to the number of rotations of the motor; first input receiving unit for receiving an input of a logical state of the sensor; superimposing unit for superimposing the pulse signal string, which is generated by the pulse generating unit, on the logical state of the sensor by modulating a duty ratio of the pulse signal string generated by the pulse generating unit based on the logical state of the sensor; and signal outputting unit for outputting a pulse signal string superimposed by the superimposing unit, and the controller includes: second input receiving unit for receiving an input of the pulse signal string output from the signal outputting unit; and demodulating unit for obtaining the logical state of the sensor by demodulating the pulse signal string received by the second input receiving unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view schematically illustrating connection between a longitudinally conveying motor and a main-body-side control board in the first embodiment of the invention.

FIG. 5 is a block diagram illustrating a control configuration relating to sensor signal transmission in the first embodiment of the invention.

DESCRIPTION OF THE PREFERRED EMBODIMENTS

Hereinafter, embodiments of the invention will be described with reference to the drawings.

The case that an MFP (Multi Function Peripheral) including a scanner function, a facsimile function, a copying function, a printer function, a data communication function, and a server function is an image forming apparatus will be described in the following embodiments. The image forming apparatus may be a facsimile machine, a copying machine or a printer instead of the MFP.

[First Embodiment]

Figure 1:
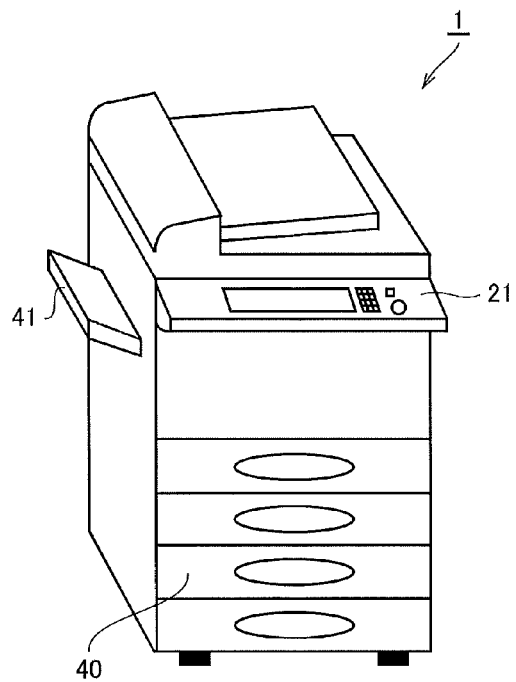
FIG. 1 is a view illustrating a schematic appearance of an MFP according to a first embodiment of the invention.
Figure 2:
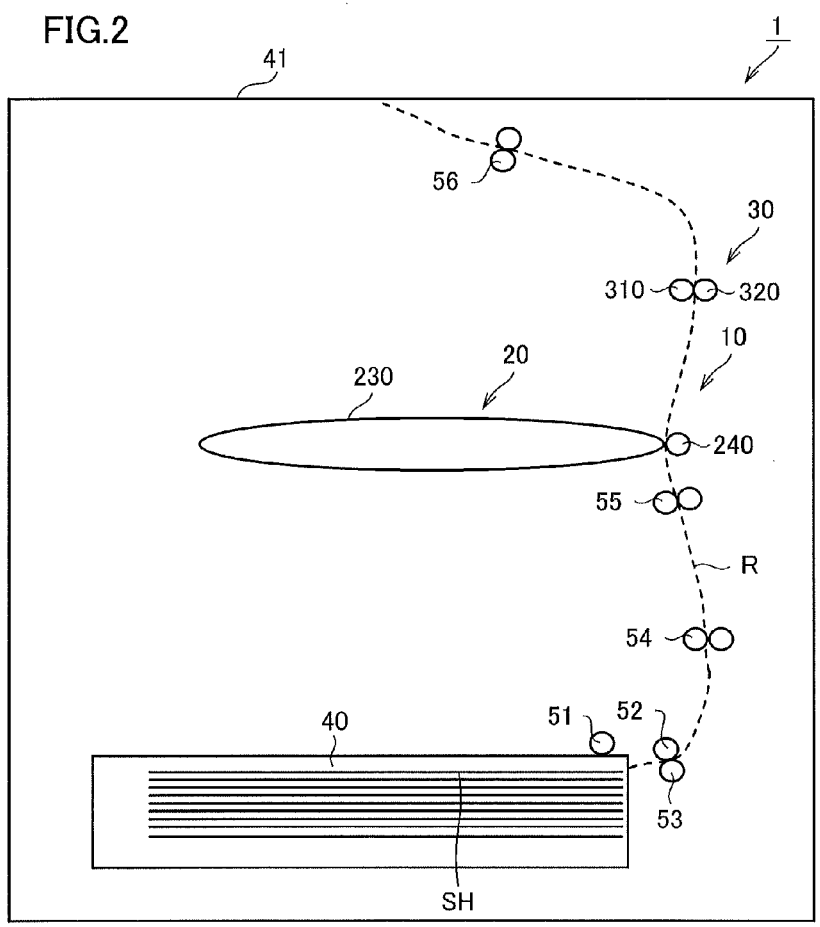
FIG. 2 is a sectional view partially illustrating the MFP in FIG. 1.

Referring to FIGS. 1 and 2, an MFP 1 that is of the image forming apparatus in a first embodiment mainly includes a sheet conveying unit 10, a toner image forming unit 20, and a fixing unit 30. During image formation, a sheet SH loaded on a sheet feeder 40 disposed in a lower portion of MFP 1 is conveyed one by one along a conveying route R by sheet conveying unit 10. Sheet SH fed from sheet feeder 40 to conveying route R is conveyed to toner image forming unit 20. Toner image forming unit 20 includes an intermediate transfer belt 230 and a secondary transfer roller 240. In toner image forming unit 20, a toner image that is primarily transferred to intermediate transfer belt 230 by an imaging unit (not illustrated) is transferred to sheet SH by secondary transfer roller 240. Then sheet SH to which the toner image is transferred is conveyed to fixing unit 30. Fixing unit 30 includes a heating roller 310 and a pressure roller 320. In fixing unit 30, sheet SH to which the toner image is transferred is conveyed while nipped between heating roller 310 and pressure roller 320, and sheet SH is subjected to heating and pressurization during that time. Therefore, fixing unit 30 fixes toner to sheet SH by melting the toner adhering to sheet SH. Then sheet SH to which the toner image is fixed by fixing unit 30 is discharged to a discharge tray 41.

Sheet conveying unit 10 includes a pickup roller 51, a feed roller 52 and a disentangling roller 53, a longitudinally conveying roller 54, a timing roller 55, and a discharge roller 56. These rollers are disposed in this order along conveying route R from the side of sheet feeder 40 toward the side of discharge tray 41.

Figure 3:
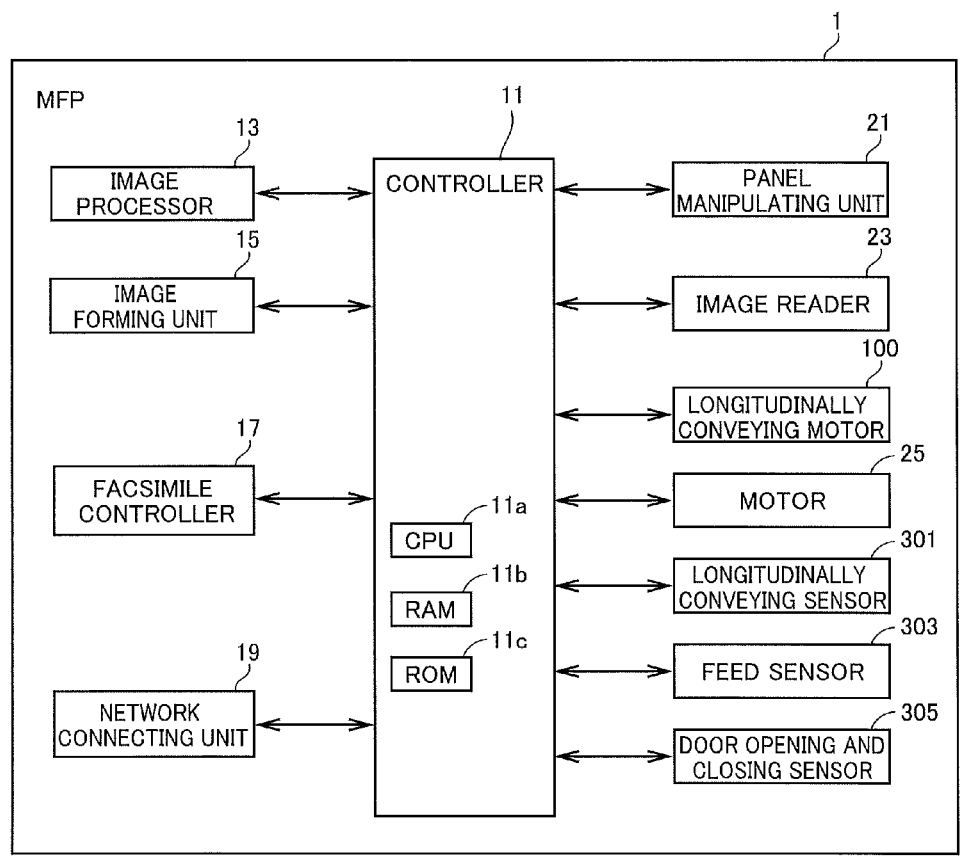
FIG. 3 is a block diagram illustrating a configuration of MFP 1 in FIG. 1.

FIG. 3 is a block diagram illustrating a configuration of MFP 1 in FIG. 1.

Referring to FIG. 3, MFP 1 includes a controller 11, an image processor 13, an image forming unit 15, a facsimile controller 17, a network connecting unit 19, a panel manipulating unit 21, an image reader 23, a longitudinally conveying motor 100, a motor 25, a longitudinally conveying sensor 301, a feed sensor 303, and a door opening and closing sensor 305.

Controller 11 controls the whole of MFP 1 with respect to various jobs such as a scan job, a copy job, a mail transmission job, and a print job. Controller 11 includes a CPU (Central Processing Unit) 11a, a RAM 11b, and a ROM 11c. CPU 11a executes a control program stored in ROM 11c. Through predetermined processing, CPU 11a reads data from RAM 11b and ROM 11c or writes data in RAM 11b.

Image processor 13 converts image information data into image data of each of colors Y, M, C, and K, and provides the post-color-conversion image data to controller 11.

Image forming unit 15 controls an image forming operation by controlling sheet conveying unit 10, toner image forming unit 20, and fixing unit 30.

Facsimile controller 17 controls transmission and reception of a facsimile machine.

In response to an instruction from controller 11, network connecting unit 19 conducts communication with an external device through a LAN according to a communication protocol such as TCP/IP.

Panel manipulating unit 21 is a user interface that receives a manipulation of MFP 1 from a user and displays various pieces of information to the user.

Image reader 23 reads an image of a document and transmits data of the image to controller 11.

Longitudinally conveying motor 100 drives longitudinally conveying roller 54.

Motor 25 drives pickup roller 51, feed roller 52, disentangling roller 53, timing roller 55, and discharge roller 56.

Longitudinally conveying sensor 301 senses the sheet passing through longitudinally conveying roller 54. Feed sensor 303 senses the sheet passing through feed roller 52. Feed sensor 303 also senses whether a sheet double transmission state is released by feed roller 52 and disentangling roller 53. Door opening and closing sensor 305 detects opening and closing states of a door provided in MFP 1.

Longitudinally conveying sensor 301 and feed sensor 303 are sensors that perform sensing (monitoring) when longitudinally conveying motor 100 is driven, and do not perform the sensing when longitudinally conveying motor 100 is stopped. Door opening and closing sensor 305 is a sensor that performs the sensing when longitudinally conveying motor 100 is stopped, and does not perform the sensing when longitudinally conveying motor 100 is driven.

FIG. 4 is a view schematically illustrating connection between a longitudinally conveying motor and a main-body-side control board in the first embodiment of the invention.

Referring to FIG. 4, in the first embodiment, a sensor signal is transmitted by utilizing longitudinally conveying motor 100. Specifically, the CPU on the main control board adjusts driving force of longitudinally conveying motor 100 using a PWM (Pulse Width Modulation) signal to perform feedback control of the rotation of longitudinally conveying motor 100 such that a detection result of a cycle of a pulse signal obtained from an encoder and an FG pattern in longitudinally conveying motor 100 of an electrophotographic apparatus is matched with a target value.

Longitudinally conveying motor 100 and a main-body-side control board 200 are connected to each other. Electronic components (such as CPU 11a) constituting controller 11 are mounted on main-body-side control board 200. Longitudinally conveying motor 100 is controlled by main-body-side control board 200. Longitudinally conveying motor 100 is a DC brushless motor that conveys the sheet. Longitudinally conveying motor 100 includes a coil (motor coil) 101, an encoder 103 (an example of pulse generating unit), and a motor-side control board 105. Coil 101 generates a magnetic field to rotate a rotor magnet. Encoder 103 generates a pulse signal string having a frequency corresponding to the number of rotation of longitudinally conveying motor 100. Motor-side control board 105 controls an amount of current passed through coil 101, and transmits and receives the signal.

Encoder 103 may be incorporated in longitudinally conveying motor 100, or encoder 103 may be provided on a motor shaft of longitudinally conveying motor 100 or a driving shaft mechanically coupled to the motor shaft. When encoder 103 is incorporated in longitudinally conveying motor 100, electromotive force is generated in a pattern printed on a motor board by the rotation of the rotor magnet, and the pulse may he generated by the electromotive force.

The pulse signal string generated by encoder 103 is reflected in an encoder signal 401 output from motor-side control board 105, and the pulse signal string is transmitted to main-body-side control board 200 located away from longitudinally conveying motor 100 in MEP 1.

On the other hand, based on received encoder signal 401, main-body-side control board 200 transmits a PWM signal 403 to longitudinally conveying motor 100 to control the drive of longitudinally conveying motor 100. Specifically, in main-body-side control board 200, CPU 11a or an ASIC (Application Specific Integrated Circuit) detects a pulse cycle of encoder signal 401, and a duty ratio of PWM signal 403 is modulated (hereinafter sometimes referred to as duty modulation) such that the pulse cycle becomes the frequency corresponding to the target number of rotations. The duty ratio of PWM signal 403 controls an average voltage applied to coil 101 of longitudinally conveying motor 100. That is, because PWM signal 403 can vary the driving force of longitudinally conveying motor 100, longitudinally conveying motor 100 is controlled at a target rotation speed by main-body-side control board 200. Usually PWM signal 403 is a logic signal (a signal expressed by high and low). Either a high duty (Hi-duty, a width at a high level to one cycle width) or a low duty (Lo-duty, a width at a low level to one cycle width) may control the average voltage applied to coil 101 of longitudinally conveying motor 100.

Plural sensors are connected to motor-side control board 105. For example, longitudinally conveying sensor 301, feed sensor 303, and door opening and closing sensor 305 are connected to longitudinally conveying motor 100. Motor-side control board 105 receives inputs of logical states of longitudinally conveying sensor 301, feed sensor 303, and door opening and closing sensor 305. Motor-side control board 105 superimposes the logical states of longitudinally conveying sensor 301, feed sensor 303, and door opening and closing sensor 305 on the pulse signal string generated by encoder 103, and outputs superimposed encoder signal 401 to main-body-side control board 200.

For example, main-body-side control board 200 may further output a rotating direction switching signal to longitudinally conveying motor 100.

FIG. 5 is a block diagram illustrating a control configuration relating to sensor signal transmission in the first embodiment of the invention. Hereinafter, sometimes longitudinally conveying sensor 301 is referred to as a sensor 1 and feed sensor 303 is referred to as a sensor 2.

Referring to FIG. 5, motor-side control board 105 includes a PWM driver 111 and a sensor signal superimposing unit 113. PWM driver 111 and sensor signal superimposing unit 113 may be formed in the same element (IC (Integrated Circuit)) or different elements. For example, main-body-side control board 200 further includes a sensor signal separating unit 203. Sensor signal separating unit 203 may be incorporated in the ASIC.

PWM signal 403 that is output from sensor signal separating unit 203 under the control of CPU 11a is input to a motor driver (not illustrated) through PWM driver 111 of motor-side control board 105. The motor driver controls an average driving voltage at longitudinally conveying motor 100 based on PWM signal 403. PWM signal 403 is input to both PWM driver 111 and sensor signal superimposing unit 113.

An encoder signal (pre-superimposition encoder signal) 405 that is of the pulse signal string generated by encoder 103 is input to sensor signal superimposing unit 113. The logical states of sensors 1 and 2 are input to sensor signal superimposing unit 113. Based on the logical states of sensors 1 and 2, sensor signal superimposing unit 113 performs the duty modulation to encoder signal 405 generated by encoder 103. Therefore, the logical states of sensors 1 and 2 are superimposed on encoder signal 405 generated by encoder 103. Sensor signal superimposing unit 113 uses cycle edge timing of PWM signal 403 in superimposing the logical states of sensors 1 and 2. Sensor signal superimposing unit 113 outputs encoder signal (post-superimposition encoder signal) 401 that is of the superimposed pulse signal string to sensor signal separating unit 203 of main-body-side control board 200.

Sensor signal separating unit 203 demodulates (separates) input encoder signal 401 into encoder signal 405 and the logical states of sensors 1 and 2, and transmits encoder signal 405 and the logical states of sensors 1 and 2 to CPU 11a. Based on encoder signal 401, CPU 11a outputs PWM signal 403 driving longitudinally conveying motor 100 from sensor signal separating unit 203 to longitudinally conveying motor 100.

Figure 6:
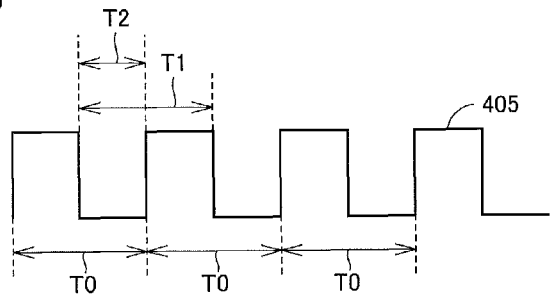
FIG. 6 is a view illustrating a waveform of a general encoder signal 405 generated by an encoder 103.

FIG. 6 is a view illustrating a waveform of general encoder signal 405 generated by encoder 103.

Referring to FIG. 6, encoder signal 405 is the pulse signal string proportional to the number of rotations of longitudinally conveying motor 100. Encoder 103 generates the constant number of pulses every rotation of the rotor magnet of longitudinally conveying motor 100. Accordingly, the frequency of the pulse is proportional to the number of rotations of longitudinally conveying motor 100. A cycle T0 is one cycle of the pulse.

Main-body-side control board 200 (main body side) obtains cycle T0 between rising edges, a cycle T1 between falling edges, and a cycle T2 of a gap between edges in the pulse of encoder signal 405. For example, a time used to obtain the cycles may be counted using the number of frequencies of PWM signal 403 or an operation clock of CPU 11a. Main-body-side control board 200 converts the obtained cycle into frequency to obtain the current rotation speed of longitudinally conveying motor 100.

In the first embodiment, main-body-side control board 200 obtains the current rotation speed of longitudinally conveying motor 100 using cycle T0 (rising edge gap) between the rising edges of encoder signal 405. For the use of cycle T0, only the rising edge is actually used as a changing point of encoder signal 405, but the falling edge is not used. Therefore, a position of the falling edge is not important in obtaining the rotation speed of longitudinally conveying motor 100, and the detection of the rotation speed of the motor is not influenced even if the duty ratio of the pulse of the encoder signal 405 changes. In the first embodiment, the logical states of sensors 1 and 2 are superimposed on encoder signal 405 by utilizing this property. That is, sensor signal superimposing unit 113 converts the state of the sensor signal into the duty ratio information (duty ratio) on the pulse of encoder signal 405 so as not to influence the cycle of encoder signal 405, and sensor signal superimposing unit 113 transmits post-conversion (post-superimposition) encoder signal 401 to sensor signal separating unit 203 of main-body-side control board 200.

Figure 7:
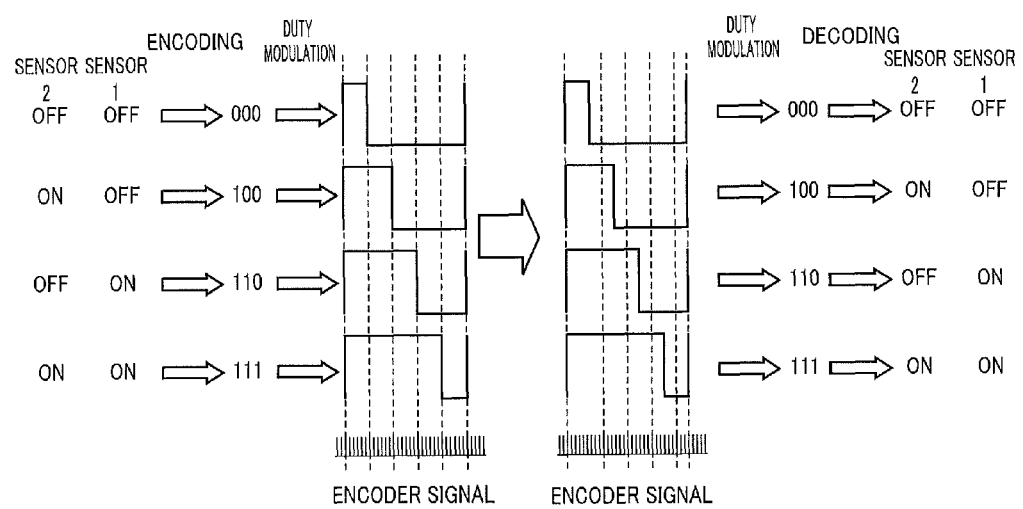
FIG. 7 is a view illustrating a specific method for superimposing logical states of sensors 1 and 2 on encoder signal 405.

FIG. 7 is a view illustrating a specific method for superimposing logical states of sensors 1 and 2 on encoder signal 405.

Referring to FIG. 7, one-bit signal indicating existence or non-existence of the sheet or the opening and closing states of the door is obtained from each of sensors 1 and 2. In the first embodiment, because an electric output level is not a substantive question, the output (high and low) of each of sensors 1 and 2 is expressed by on and off.

Each of the logical states to be taken by sensors 1 and 2 is one bit, and the total of logical states is two bits. Therefore, the number of combinations (the number of combinations of on and off) of the logical states to be taken by sensors 1 and 2 is four. Sensor signal superimposing unit 113 encodes the logical states of sensors 1 and 2 into a three-bit signal based on the following conditions (1) to (3). Any of conditions (1) to (3) applies to the combinations of the logical states of sensors 1 and 2.

Condition (1): The logical states of sensors 1 and 2 are encoded into a signal (000) when the logical states of sensors 1 and 2 are 0 (off).

Condition (2): The logical states of sensors 1 and 2 are encoded into a signal (11) when the logical states of sensors 1 and 2 are 1 (on).

Condition (3): When the logical states of sensors 1 and 2 are a mixed state of 0 and 1, the logical states of sensors 1 and 2 are encoded such that 1 and 1 or 0 and 0 are put together, and such that 1 and 1 is arrayed on an MSB (Most Significant Bit) side while 0 and 0 are arrayed on an LSB (Least Significant Bit) side.

When the signal is encoded under the condition (3), the signal becomes only (100) and (110). For example, "1" and "1" are decoupled by "0" in signal (101), and "1" and "1" are decoupled by "0" in signal (010). Therefore, the logical states of sensors 1 and 2 are not allocated to signals (101) and (010). In signals (011) and (001), "1" is located on the LSB side, and "0" is located on the MSB side. Therefore, the logical states of sensors 1 and 2 are not allocated to signals (011) and (001). Accordingly, the three-bit signal that is obtained by encoding the logical states of sensors 1 and 2 becomes any of states (000), (100), (110), and (111). In other words, the four states of the three-bit signal correspond to the combinations of the logical states to be taken by sensors 1 and 2 in a one-on-one manner.

FIG. 7 illustrates an example of the correspondence between the logical states of sensors 1 and 2 and the three-bit signals. The logical states of sensors 1 and 2 correspond arbitrarily to the four states of the three-bit signal, and it is only necessary that the correspondence between the logical states of sensors 1 and 2 and the four states of the three-bit signal be matched with the correspondence during decoding.

Then sensor signal superimposing unit 113 performs the duty modulation to encoder signal 405 based on the obtained three-bit signal, thereby superimposing the three-bit signal on encoder signal 405.

Figure 8:
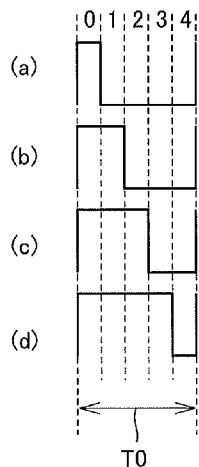
FIG. 8 is a view schematically illustrating an encoder signal 401 in which a pulse cycle is divided into five intervals.

FIG. 8 is a view schematically illustrating encoder signal 401 in which the pulse cycle is divided into five intervals.

Referring to FIGS. 7 and 8, sensor signal superimposing unit 113 divides cycle T0 of encoder signal 405 into five intervals to allocate interval values d0=0 to 4 to the interval from the MSB side toward the LSB side. Sensor signal superimposing unit 113 sets an interval 0 to the interval in which high is always maintained irrespective of the sensor state, and sets an interval 4 to the interval in which low is always maintained irrespective of the sensor state. Then sensor signal superimposing unit 113 allocates the three-bit signals to the remaining intervals 1 to 3. Sensor signal superimposing unit 113 allocates the MSB in the three-bit signal to interval 1, allocates the intermediate bit to interval 2, and allocates the LSB to interval 3. Then sensor signal superimposing unit 113 sets the interval to high when the state of the allocated bit is 1, and sensor signal superimposing unit 113 sets the interval to low when the state of the allocated bit is 0. As a result, the logical states of sensors 1 and 2 are superimposed on encoder signal 405 by performing the duty modulation to encoder signal 405 based on the three-bit signal, thereby obtaining encoder signal 401.

Specifically, encoder signal 401 illustrated in a part (a) of FIG. 8 is obtained when encoder signal 405 is modulated based on three-bit signal (000), and encoder signal 401 illustrated in a part (b) of FIG. 8 is obtained when encoder signal 405 is modulated based on three-bit signal (100). Encoder signal 401 illustrated in a part (c) of FIG. 8 is obtained when encoder signal 405 is modulated based on three-bit signal (110), and encoder signal 401 illustrated in a part (d) of FIG. 8 is obtained when encoder signal 405 is modulated based on three-bit signal (111).

Then, on a reception side (side of main-body-side control board 200) of encoder signal 401, sensor signal separating unit 203 extracts the three-bit signal from encoder signal 401. When an extraction point of the three-bit signal is located near the center of each of intervals 1 to 3, the extraction is hardly influenced by the noise or the fluctuation in motor speed. Then sensor signal separating unit 203 demodulates (decodes) the extracted three-bit signal to obtain the logical states of sensors 1 and 2. The decode processing is performed using the correspondence opposite to the encode processing.

In the first embodiment, the current rotation speed of longitudinally conveying motor 100 is obtained using cycle T0 (FIG. 6) between the rising edges of encoder signal 405. Alternatively, the rotation speed may be obtained using cycle T1 between the falling edges or cycle T2 of the gap between the edges. For example, it is assumed that the rotation speed is obtained using cycle T1. When the logical states of sensors 1 and 2 are the mixed state of 0 and 1, the condition that the logical states of sensors 1 and 2 are encoded such that 1 and 1 or 0 and 0 are put together and such that 0 and 0 is arrayed on the MSB side while 1 and 1 are arrayed on the LSB side may be used instead of condition (3) encoding the logical states of sensors 1 and 2 into the three-bit signals. When the rotation speed is obtained using cycle T2, the logical states of sensors 1 and 2 may be encoded such that a half cycle of encoder signal 405 becomes one cycle of post-modulation encoder signal 401 (the frequency of encoder signal 401 becomes double encoder signal 405).

Detailed configurations of sensor signal superimposing unit 113 and sensor signal separating unit 203 will be described below.

Figure 9:
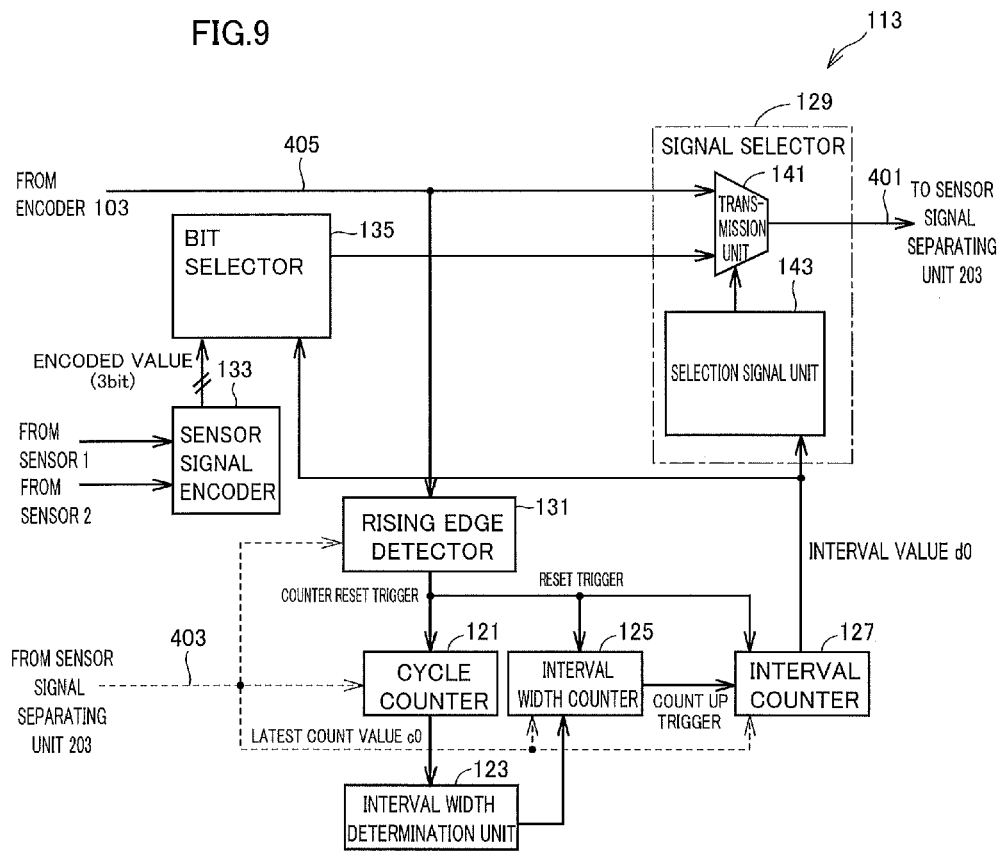
FIG. 9 is a block diagram illustrating a detailed configuration of a sensor signal superimposing unit 113 in FIG. 5.

FIG. 9 is a block diagram illustrating a detailed configuration of sensor signal superimposing unit 113 in FIG. 5.

Referring to FIG. 9, sensor signal superimposing unit 113 includes a cycle counter 121, an interval width determination unit 123, an interval width counter 125, an interval counter 127, a signal selector 129 (examples of superimposing unit and signal outputting unit), a rising edge detector 131, a sensor signal encoder 133, and a bit selector 135 (an example of first input receiving unit).

Encoder signal (pre-superimposition motor encoder signal) 405 generated by encoder 103 is output to signal selector 129 and rising edge detector 131. Rising edge detector 131 detects the rising edge of encoder signal 405, and cycle counter 121 counts the cycle based on the rising edge. A counter reset trigger acts on cycle counter 121 every time the count value is fixed. Interval width determination unit 123 determines a value in which a latest fixed cycle count value c0 obtained by cycle counter 121 is divided by 5 as an interval width n0 (=c0/5). Interval width counter 125 is activated while interval width n0 determined by interval width determination unit 123 is set to a maximum value, and interval counter 127 counts interval value d0 every time interval width counter 125 counts up. Therefore, one cycle of the pulse of encoder signal 405 is divided into five intervals 0 to 4. A reset trigger acts on interval width counter 125 and interval counter 127 every time the rising edge is detected. Interval value d0 counted by interval counter 127 is transmitted to a selection signal unit 143 of signal selector 129 and bit selector 135.

The outputs of sensors 1 and 2 are transmitted to sensor signal encoder 133. Sensor signal encoder 133 converts the outputs of sensors 1 and 2 into the logical states, and transmits the logical states to bit selector 135. When receiving the logical states of sensors 1 and 2, bit selector 135 reflects a numerical value of each digit of a bit 2, a bit 1, and a bit 0 (of the decoded value) of the three-bit signal in the state of the pulse signal of each of pulse intervals 1 to 3, and outputs the logical states of sensors 1 and 2 to a transmission unit 141 of signal selector 129.

Signal selector 129 modulates the duty ratio of encoder signal 405 based on the logical states of sensors 1 and 2, superimposes the logical states of sensors 1 and 2 on encoder signal 405, and outputs the post-superimposition to encoder signal 401.

When interval value d0 output from interval counter 127 is 0 or 4, selection signal unit 143 selects the encoder side to directly transmit encoder signal 405 input to signal selector 129 to sensor signal separating unit 203 of main-body-side control board 200 from transmission unit 141 (alternatively, selection signal unit 143 may fixedly output high when interval value d0 is 0, and selection signal unit 143 may fixedly output low when interval value d0 is 4). When interval value d0 output from interval counter 127 is one of 1 to 3 (in the case of 1≤d0≤3), selection signal unit 143 selects the decoder side, and transmission unit 141 transmits the values of intervals 1 to 3 input from bit selector 135 to sensor signal separating unit 203.

In principle, the maximum value (=interval width n0) of interval width counter 125 is calculated based on the preceding cycle count value c0. The frequency of PWM signal 403 is used as a clock in operating each of rising edge detector 131, cycle counter 121, interval width counter 125, and interval counter 127. Because the number of pulses of the encoder of the motor used in the conveyance is not very large, PWM signal 403 may be used as the clock such that the speed of the frequency of PMW signal 403 is enhanced about ten times. Usually the duty ratio of PMW signal 403 is taken in a range of 0% to 100%. When PWM signal 403 is used as the clock for the counter, the duty ratio is set more than 0 and lower than 100% (0<Duty<100%), and PWM signal 403 is slightly restricted such that the duty ratio does not become 0% and 100%.

The cycle of the pulse of encoder signal 405 may be divided into an arbitrary number of intervals. For example, cycle T0 of the pulse of encoder signal 405 may be divided into eight intervals. In this case, intervals 4 to 7 may always be fixed to high. Therefore, the five-division calculation can be replaced by the eight-division (two to the third power) calculation, a division circuit for obtaining the maximum value of interval width counter 125 can largely be simplified.

Figure 10:
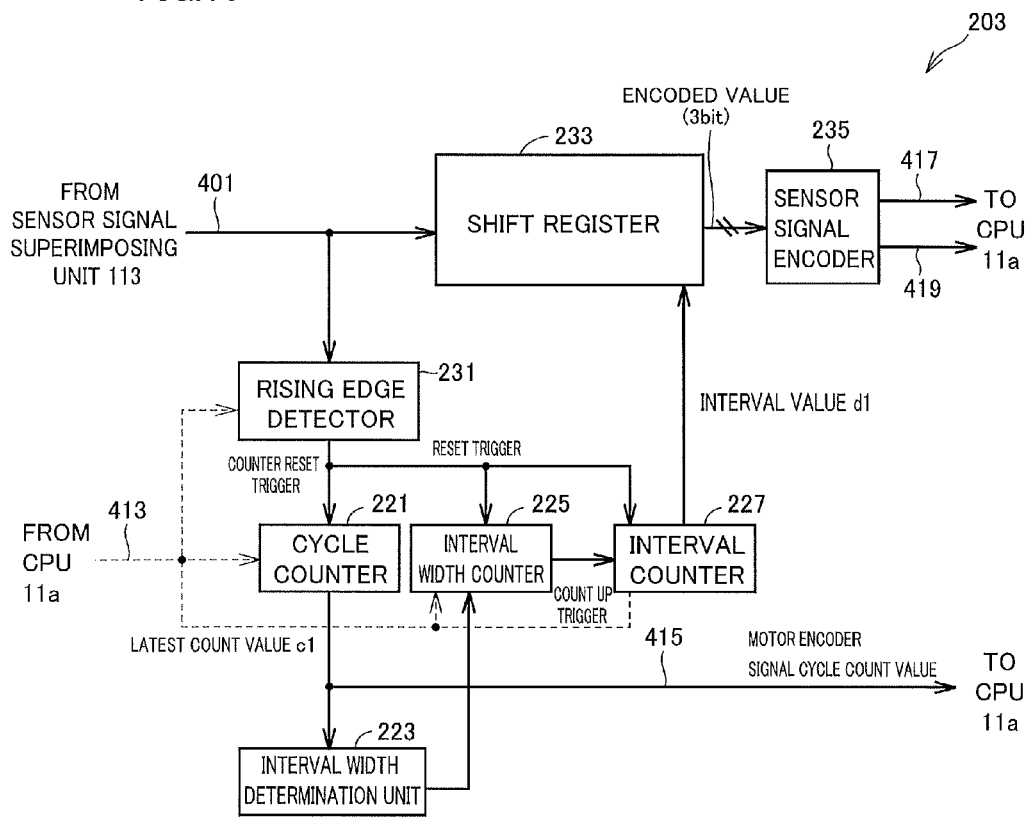
FIG. 10 is a block diagram illustrating a detailed configuration of a sensor signal separating unit 203 in FIG. 5.

FIG. 10 is a block diagram illustrating a detailed configuration of sensor signal separating unit 203 in FIG. 5.

Referring to FIG. 10, sensor signal separating unit 203 includes a cycle counter 221, an interval width determination unit 223, an interval width counter 225, an interval counter 227, a rising edge detector 231, a shift register 233 (an example of second input receiving unit), and a sensor signal encoder 235 (an example of demodulating unit).

Encoder signal (post-superimposition encoder signal) 401 transmitted from transmission unit 141 of sensor signal superimposing unit 113 is output to shift register 233 and rising edge detector 231. Rising edge detector 231 detects the rising edge of encoder signal 401, and cycle counter 221 counts the cycle based on the rising edge detected by rising edge detector 231. A counter reset trigger acts on cycle counter 221 every time the count value is fixed. Interval width determination unit 223 determines a value in which a latest fixed cycle count value c1 obtained by cycle counter 221 is divided by 10 as an interval width n1 (=c1/10). That is, interval width determination unit 223 differs from interval width determination unit 123 of sensor signal superimposing unit 113 in that the value in which cycle count value c1 is divided by 10 is determined as the interval width n1 (the maximum value of interval width counter 225). Interval width counter 225 performs the count while interval width n1 determined by interval width determination unit 223 is set to a maximum value. Interval counter 227 counts interval value d1 every time interval width counter 225 counts up. Therefore, one cycle of the pulse of encoder signal 401 is divided into ten intervals 0 to 9. A reset trigger acts on interval width counter 225 and interval counter 227 every time the rising edge is detected. Interval value d1 counted by interval counter 227 is transmitted to a sift register 233.

PWM signal 403 or an operation clock signal 413 of CPU 11a may be used as the operation clock of each counter.

For example, shift register 233 captures (samples) encoder signal 401 in timing of the count-up trigger of interval width counter 225 when interval value d1 is 2, 4, and 6, and extracts the three-bit signal from encoder signal 401. For example, shift register 233 transmits the sampled value to sensor signal encoder 235 (loads the sampled value to a decode value register) in timing of the counter reset trigger of interval width counter 225 when interval value d1 is 7.

Sensor signal encoder 235 obtains logical states 417 and 419 of sensors 1 and 2 by decoding (demodulating) the three-bit signal received from shift register 233, and transmits logical states 417 and 419 to CPU 11a.

Cycle count value c1 (motor encoder signal cycle count value) obtained by cycle counter 221 is transmitted to CPU 11a, and CPU 11a acquires the number of rotations of longitudinally conveying motor 100 based on cycle count value c1.

Figure 11:
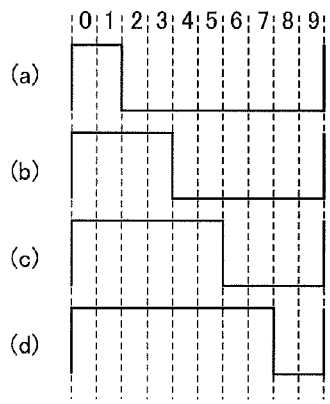
FIG. 11 is a view schematically illustrating encoder signal 401 in which the pulse cycle is divided into ten intervals.

FIG. 11 is a view schematically illustrating encoder signal 401 in which the pulse cycle is divided into ten intervals.

Referring to FIG. 11, three-bit signal (000) is decoded from encoder signal 401 illustrated in a part (a), and three-bit signal (100) is decoded from encoder signal 401 illustrated in a part (b). Three-bit signal (110) is decoded from encoder signal 401 illustrated in a part (c), and three-bit signal (111) is decoded from encoder signal 401 illustrated in a part (d).

One sensor may be connected to longitudinally conveying motor 100, or no sensor may be connected to longitudinally conveying motor 100. In such cases, a circuit is pulled up or pulled down in the motor board for connecting the sensor, and therefore it is not always necessary to connect the two sensors. Even in the configuration in which the sensor is not connected, only the duty ratio of encoder signal 401 is fixed, and there is no influence on the encoder cycle.

In the first embodiment, the logical states of the two sensors are encoded into the three-bit signals, and the cycle of encoder signal 401 is divided into the five intervals to superimpose the logical states of the sensors. Alternatively, the logical states of the three sensors may be superimposed. In this case, the logical states of the three sensors are encoded into seven-bit signals, and the cycle of encoder signal 401 is divided into nine intervals to superimpose the logical states of the sensors. The logical states of at least four sensors may be superimposed on encoder signal 401.

Processing performed by sensor signal superimposing unit 113 with longitudinally conveying motor 100 being stopped will be described below.

Figure 12:
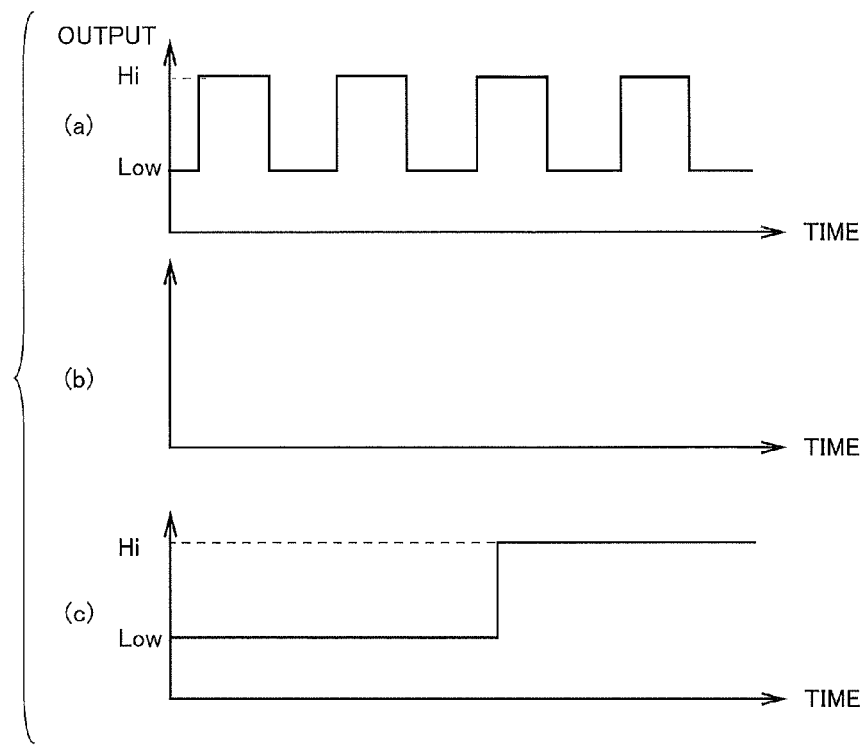
FIG. 12 is a view schematically illustrating encoder signal 401 that is output from sensor signal superimposing unit 113 when a longitudinally conveying motor 100 is stopped.

FIG. 12 is a view schematically illustrating encoder signal 401 that is output from sensor signal superimposing unit 113 when longitudinally conveying motor 100 is stopped. A part (a) of FIG. 12 illustrates encoder signal 405 when longitudinally conveying motor 100 is driven, a part (b) illustrates encoder signal 405 when longitudinally conveying motor 100 is stopped, and a part (c) illustrates encoder signal 401 when longitudinally conveying motor 100 is stopped.

Referring to FIG. 12, when longitudinally conveying motor 100 is driven (operated), encoder 103 generates encoder signal 405 including the pulse signal string proportional to the number of rotations of longitudinally conveying motor 100 as illustrated in the part (a). On the other hand, when longitudinally conveying motor 100 is stopped, because encoder signal 405 generated by encoder 103 is eliminated as illustrated in the part (b), the encoder signal on which the logical states of sensors 1 and 2 are superimposed does not exist. Accordingly, only the logical states of the sensors that perform the monitoring only with the motor being driven can be superimposed on encoder signal 405 by the above method.

Accordingly, when longitudinally conveying motor 100 is stopped, the logical state of door opening and closing sensor 305 (hereinafter sometimes referred to as a sensor 3) that is of the sensor that performs the monitoring only with the motor being stopped may directly (without superimposition) be output as encoder signal 401 as illustrated in the part (c). In the part (c), door opening and closing sensor 303 outputs high after outputting low for a given time. Therefore, the wire from sensor 3 to main-body-side control board 200 can further be reduced.

Whether longitudinally conveying motor 100 is stopped may be determined based on whether cycle counter 121 overflows. When cycle counter 121 overflows, the output of encoder signal 401 may directly be switched to the output value of door opening and closing sensor 305.

[Second Embodiment]

In MFP 1, sometimes the number of rotations of longitudinally conveying motor 100 fluctuates rapidly. In such cases, the rapid fluctuation is also generated in encoder signal 405 and encoder signal 401, and there is a temporary risk that the stable transmission of the logical states of sensors 1 and 2 cannot be performed. A method for stably transmitting the logical states of sensors 1 and 2 even if the number of rotations of longitudinally conveying motor 100 fluctuates rapidly will be described in a second embodiment.

First an operation on the side of main-body-side control board 200 (reception side) will be described.

Figure 13:
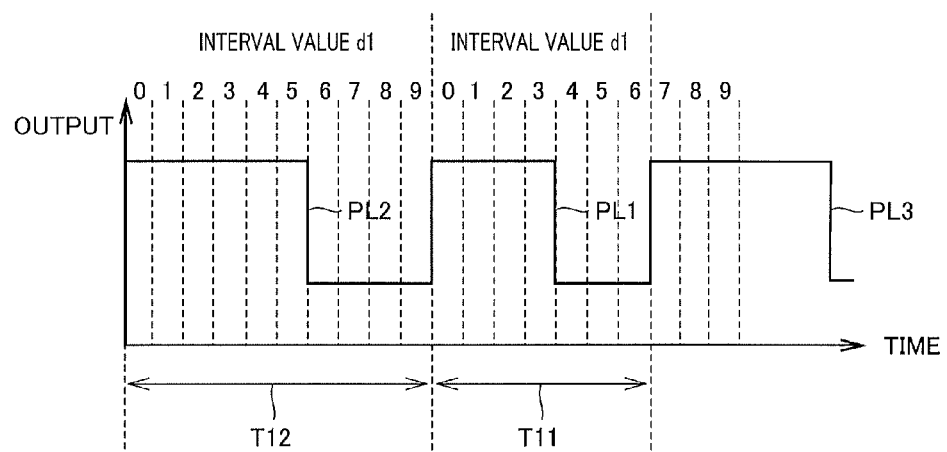
FIG. 13 is a view schematically illustrating a change of encoder signal 401 that is input to a main-body-side control board 200 when a load applied on longitudinally conveying motor 100 is rapidly reduced.

FIG. 13 is a view schematically illustrating a change of encoder signal 401 that is input to main-body-side control board 200 when a load applied on longitudinally conveying motor 100 is rapidly reduced.

Referring to FIG. 13, when the load applied on longitudinally conveying motor 100 is rapidly reduced to temporarily increase the number of rotations of longitudinally conveying motor 100, temporarily a cycle T11 of a pulse PL1 in encoder signal 401 input to sensor signal separating unit 203 of main-body-side control board 200 is extremely shortened compared with a cycle T12 of a preceding pulse PL2. Because interval width counter 225 counts pulse PL1 based on the interval width calculated from cycle T12 of preceding pulse PL2, the timing of the count-up trigger of interval width counter 225 is possibly deviated. Specifically, when interval value d1 is 2, 4, and 6 in preceding pulse PL2, sensor signal separating unit 203 detects the outputs of high, high, and low. On the other hand, when interval value d1 is 2, 4, and 6 in pulse PL1, sensor signal separating unit 203 falsely detects the outputs of high, low, and low due to the deviation of interval width counter 225.

In the second embodiment, CPU 11a retains the sensor logical states obtained by decoding pulse PL1 in RAM 11b of controller 11. CPU 11a detects cycle T11 of pulse PL1 based on the count value of cycle counter 221 at the time the cycle of pulse PL1 is ended (in the timing of the rising edge at which pulse PL1 is switched to a subsequent pulse PL3). When cycle T11 of pulse PL1 is deviated from cycle T12 of preceding (past) pulse PL2 by a predetermined time (or a predetermined ratio) or more, CPU 11a determines that the false detection is possibly generated, discards the retained decode result of pulse PL1, adopts the decode result of preceding pulse PL2 to obtain the logical states of sensors 1 and 2 from preceding pulse PL2. On the other hand, when the deviation of cycle T11 from preceding cycle T12 is lower than the predetermined time (or the predetermined ratio), CPU 11a determines that the possibility of the false detection does not exist, and adopts the retained decode result of pulse PL1.

For example, it is assumed that the output of the pulse is sampled at a rear end of interval 6. When the timing at the rear end of interval 6 overlaps into a rear end of adjacent interval 5 or a rear end of interval 7, the false detection is generated. Therefore, desirably a margin is one interval value d1. Accordingly, when the value in which cycle count value c1 is divided into ten is used as one interval width, desirably the predetermined time (or the predetermined ratio) is about 10%.

An operation on the side of longitudinally conveying motor 100 (transmission side) will be described below.

Figure 14:
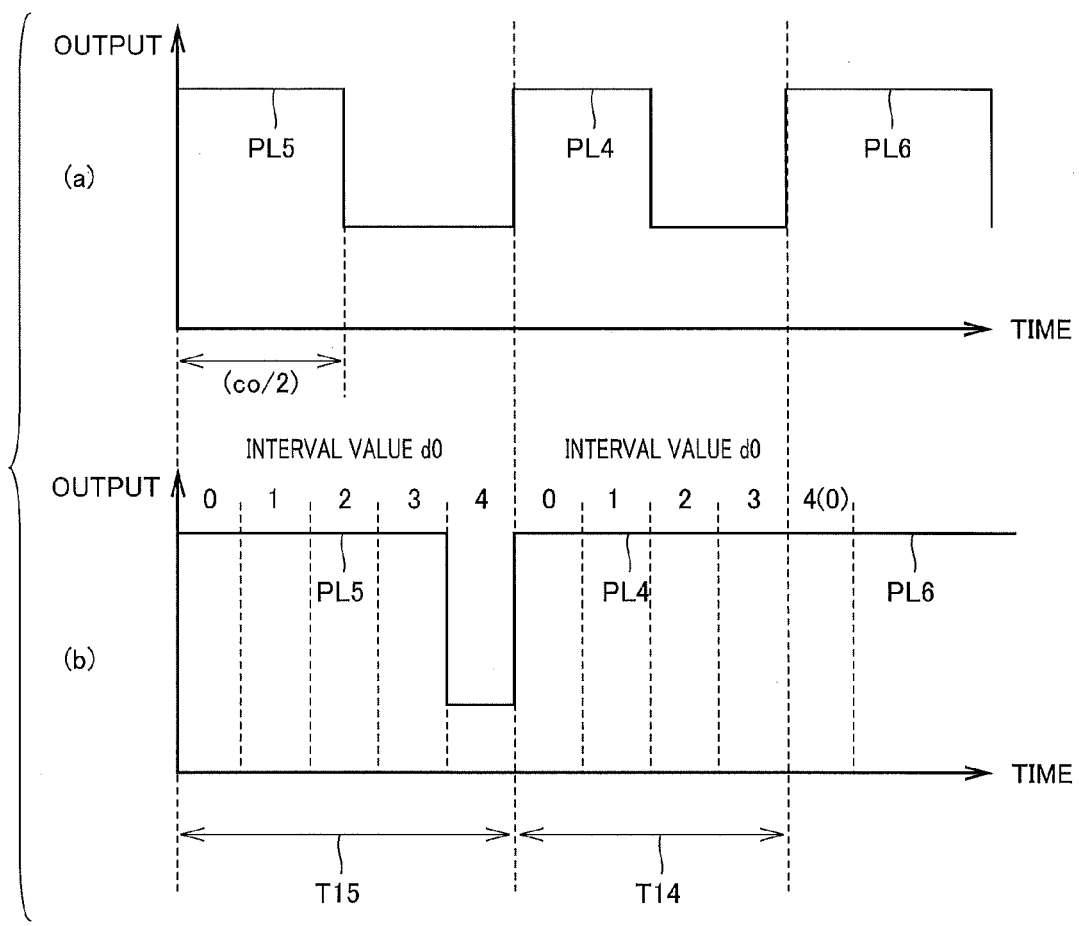
FIG. 14 is a view schematically illustrating the change of encoder signal 405 generated by encoder 103 and the change of encoder signal 401 generated by sensor signal separating unit 203 when the load applied on longitudinally conveying motor 100 is rapidly reduced.

FIG. 14 is a view schematically illustrating the change of encoder signal 405 generated by encoder 103 and the change of encoder signal 401 generated by the sensor signal separating unit 203 when the load applied on longitudinally conveying motor 100 is rapidly reduced. A part (a) of FIG. 14 illustrates the change of encoder signal 405, and a part (b) illustrates the change of encoder signal 401.

Referring to FIG. 14, when the load applied on longitudinally conveying motor 100 is rapidly reduced to temporarily increase the number of rotations of longitudinally conveying motor 100, temporarily a cycle T14 of a pulse PL4 in encoder signal 405 is extremely shortened compared with a cycle T15 of a preceding pulse PL5 as illustrated in the part (a). Interval width counter 125 counts pulse PL4 based on the interval width calculated from cycle T15 of preceding pulse PL5. Therefore, when sensor signal superimposing unit 113 superimposes three-bit signal (111) on encoder signal 405, possibly the rising edge (interval 0) of a subsequent pulse PL6 comes before interval 4 of pulse PL4 is output (while interval 3 is output) as illustrated in the part (b). In this case, while high is output in interval 3 of pulse PL4, low is not output in interval 4 of pulse PL4, but high is output in interval 0 of subsequent pulse PL6. Therefore, the intervals of the two cycles of pulses PL4 and PL6 are coupled. When encoder signal 401 in which the intervals of the two cycles of pulses PL4 and PL6 are coupled is transmitted from longitudinally conveying motor 100, possibly the side of main-body-side control board 200 understands that the cycle of the pulse of encoder signal 401 is widened, and falsely determines that the number of rotations of longitudinally conveying motor 100 is decreased.

In the second embodiment, CPU 11a monitors the time period from the rise to the fall in one cycle of encoder signal 405. For example, when the duty ratio of encoder signal 405 is 50%, the pulse falling position is located in the center of interval 2 as illustrated in the part (a) of FIG. 14. When the number of rotations of longitudinally conveying motor 100 does not fluctuate, it is estimated that the time period from the rise to the fall of pulse PL4 becomes a half value (c0/2) of cycle count value c0 of preceding pulse PL5. Accordingly, CPU 11a continuously performs the operation when the deviation (change amount) of the half value (c0/2) from the count value from the rise to the fall of pulse PL4 that is of the monitoring target is lower than a predetermined amount. On the other hand, when the deviation of the half value (c0/2) from the count value from the rise to the fall of pulse PL4 is equal to or more than the predetermined amount, CPU 11a instantaneously changes encoder signal 401 to low as an emergency operation (inverts the logical state of encoder signal 401). The emergency operation prevents the false detection of the cycle of encoder signal 401.

The predetermined amount may be a value enough to prevent the elimination of interval 4. For example, it is assumed that the duty ratio of encoder signal 401 is 50%. When the falling position of pulse PL4 is deviated by a half of the interval width or more, after the remaining half cycle elapses, interval 4 is output while the falling position is deviated by at least one interval width in total, and therefore interval 4 is predicted to be eliminated in pulse PL4. Accordingly, the emergency operation may be performed when the falling position of pulse PL4 is deviated by 20% of cycle count value c0 that is of a ratio corresponding to a half width of interval 4 to the half cycle.

[Third Embodiment]

MFP 1 may transmit logical states of plural sensors such as a sensor detecting the size of the sheet to main-body-side control board 200 even when longitudinally conveying motor 100 is stopped. A configuration, in which the logical states of the plural sensors can be transmitted even when longitudinally conveying motor 100 is stopped, will be described in a third embodiment.

Figure 15:
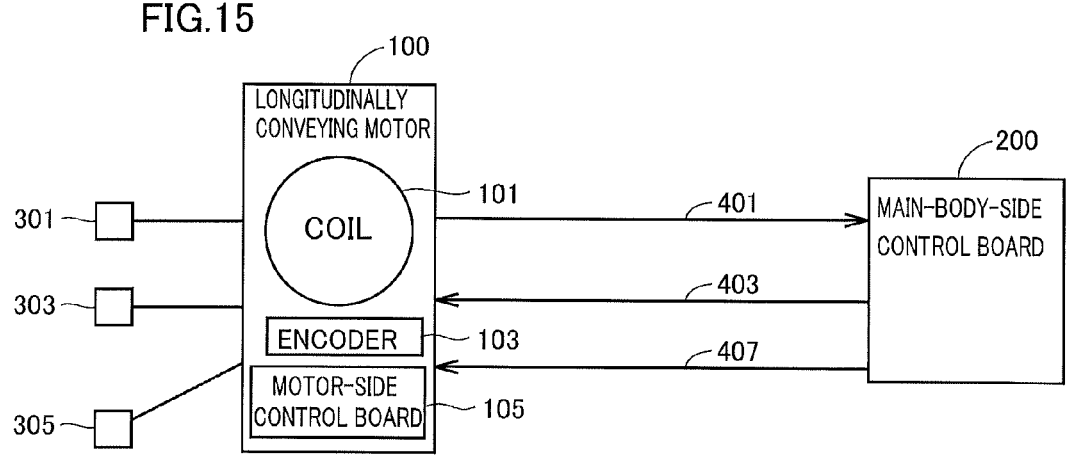
FIG. 15 is a view schematically illustrating the connection between the longitudinally conveying motor and the main-body-side control board in a third embodiment of the invention.

FIG. 15 is a view schematically illustrating the connection between the longitudinally conveying motor and the main-body-side control board in a third embodiment of the invention.

Referring to FIG. 15, longitudinally conveying motor 100 can receive a brake signal 407 output from sensor signal separating unit 203 of main-body-side control board 200. Generally, some motors used in the conveying system can receive the brake signal in order to enhance the speed of the stopping operation. In the configuration of FIG. 15, when brake signal 407 is in an on-state, longitudinally conveying motor 100 is braked in preference to PWM signal 403 controlling the number of rotations of longitudinally conveying motor 100. Accordingly, main-body-side control board 200 maintains brake signal 407 in the on-state even when longitudinally conveying motor 100 is stopped, which allows main-body-side control board 200 to output PWM signal 403 while longitudinally conveying motor 100 is stopped. As a result, even when longitudinally conveying motor 100 is stopped, the logical states of the plural sensors can be transmitted from longitudinally conveying motor 100 to main-body-side control board 200.

Except the above configuration, other configurations of longitudinally conveying motor 100 and main-body-side control board 200 are identical to those of the first embodiment. Therefore, the same member is designated by the same numeral, and the overlapping description is omitted.

Figure 16:
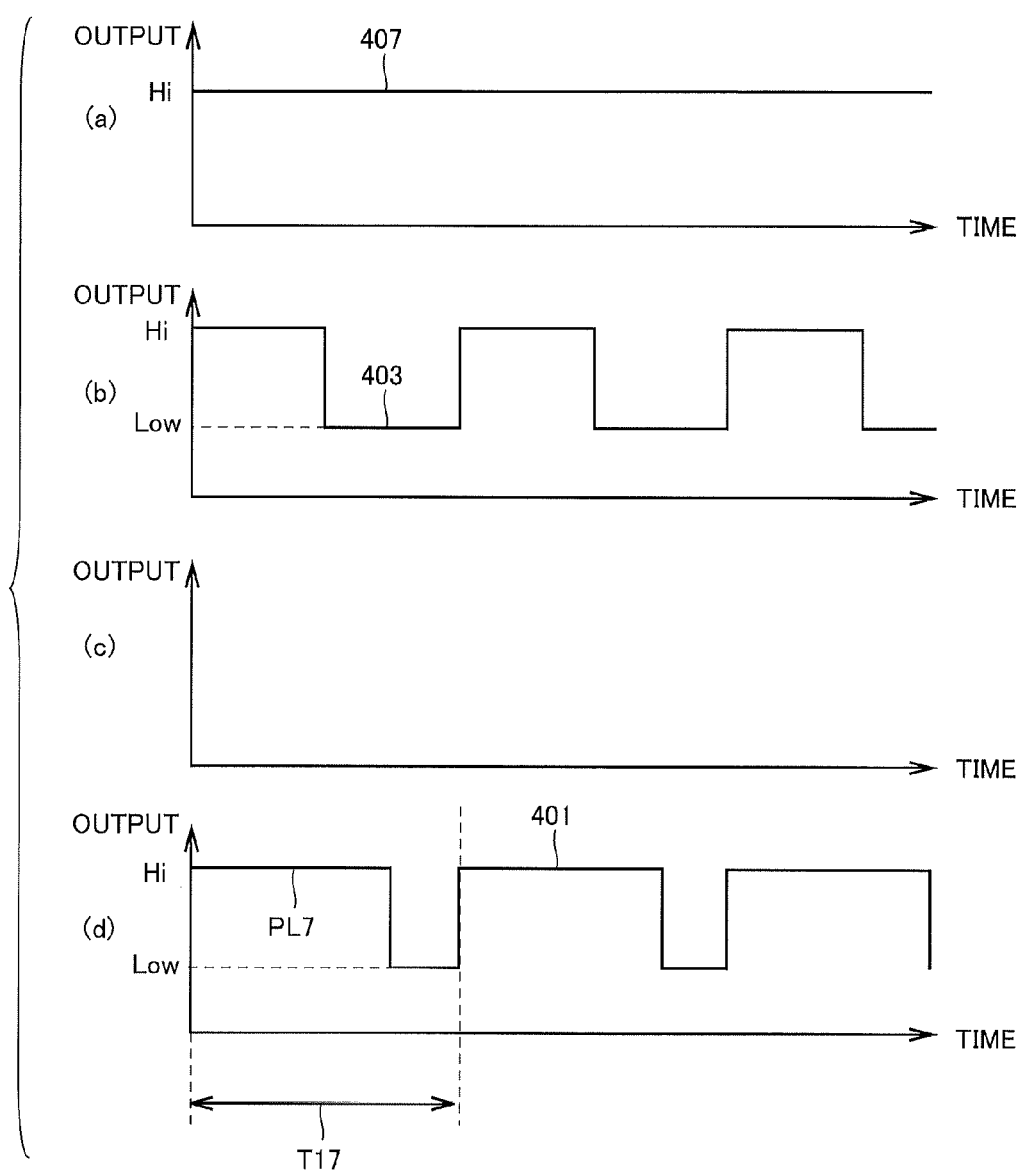
FIG. 16 is a view schematically illustrating each signal when a brake signal is in an on-state.

FIG. 16 is a view schematically illustrating each signal when the brake signal is in the on-state. A part (a) illustrates brake signal 407, a part (b) illustrates PWM signal 403, a part (c) illustrates encoder signal 405, and a part (d) illustrates encoder signal 401.

Referring to FIG. 16, even if PWM signal 403 is output as illustrated in the part (b) while brake signal 407 is in the on-state as illustrated in the part (a), longitudinally conveying motor 100 remains stopped. In this case, encoder signal 405 is not generated as illustrated in the part (c). On the other hand, for example, sensor signal superimposing unit 113 generates encoder signal 401 including a pulse PL7 in which a cycle T17 is fixed. For example, the logical states of sensors 1 and 2 are superimposed on encoder signal 401. Therefore, even when longitudinally conveying motor 100 is stopped, the logical states of sensors 1 and 2 can be transmitted from longitudinally conveying motor 100 to main-body-side control board 200.

The logical states of the sensors having the same combination are transmitted with encoder signal 401 both in the case that longitudinally conveying motor 100 is driven may and in the case that longitudinally conveying motor 100 is stopped, or the logical states of the sensors having different combinations are transmitted with encoder signal 401 both in the case that longitudinally conveying motor 100 is driven and in the case that longitudinally conveying motor 100 is stopped. When the logical states of the sensor having different combinations are transmitted with encoder signal 401 both in the case that longitudinally conveying motor 100 is driven and in the case that longitudinally conveying motor 100 is stopped, whether longitudinally conveying motor 100 is stopped is determined based on whether cycle counter 121 overflows similarly to the first embodiment.

[Advantageous Effects of Embodiments]

In the above embodiments, the sensor that detects the existence or non-existence of the sheet or the opening and closing states of the door is connected to the control board of the longitudinally conveying motor, the output of the sensor is encoded and superimposed on the encoder signal, and the post-superimposition encoder signal is decoded and extracted on the main-body-side control board side. According to the embodiments, because the signal in which the output of the sensor is encoded is transmitted while superimposed on the encoder signal, it is only necessary to draw the wire from the sensor to the motor close to the sensor, but it is not necessary to draw the wire from sensor to the main-body-side control board. Therefore, the wiring amount of the sensor can be reduced, and the space necessary for the wiring route is reduced. Additionally, the sensor connector on the main-body-side control board is eliminated. As a result, the downsizing of the apparatus can be achieved. The assembly work is also facilitated.

According to the above embodiments, the image forming apparatus that can achieve the downsizing thereof can be provided. According to the embodiments, the image forming apparatus that facilitates the assembly work and the maintenance can be provided.

Because the configuration in which the longitudinally conveying motor is not connected to the sensor may be adopted, the wiring amount is relatively small. Therefore, the image forming apparatus of the embodiments is compatible with the small-size image forming apparatus in which the mechanism reducing the wiring amount is not required or the image forming apparatus in which the conventional DC brushless motor is used. It is not necessary to prepare the motor having two kinds of the interfaces. That is, even if the MFP has the configuration in which the wiring of the sensor does not troublesome because the control board is located near the sensor, or even if the MFP has the conventional configuration different from the configuration in which the main-body-side control board demodulates and decodes the encoder signal to extract the state of the sensor, the motor of the embodiments can directly be applied to the main-body-side control board.

In the case that the wiring failure is suspicious in an investigation of causes during the generation of the operation failure of the sensor, it is only necessary to check the wiring having the short distance between the sensor and the longitudinally conveying motor. This is because the existence or non-existence of the wiring failure can easily be checked between the longitudinally conveying motor and the main-body-side control board by an operation check of the longitudinally conveying motor. As a result, the service and the maintenance work are facilitated, and not only the cost relating to the reduction of the wiring amount but also the cost relating to the assembly work, the service, and the maintenance work can be reduced.

When the longitudinally conveying motor is stopped, the logical state of the sensor that performs the monitoring only with the longitudinally conveying motor being stopped is directly output to the encoder signal. Therefore, the wire from the sensor to the main-body-side control board can further be reduced.

According to the second embodiment, the logical state of the sensor can stably be transmitted even if the number of rotations of the longitudinally conveying motor fluctuates rapidly.

According to the third embodiment, even when the longitudinally conveying motor is stopped, the logical states of the plural sensors can be transmitted to the main-body-side control board.

[Other]

In the above embodiments, the logical state of the sensor is superimposed on the encoder signal of the longitudinally conveying motor. Alternatively, the logical state of the sensor may be superimposed on an encoder signal of another motor (such as the motor that drives the roller conveying the sheet and the motor that drives the roller of the fixing device) that drives the image forming apparatus.

In the main-body-side control board, the motor may be driven using a PAM (Pulse Amplitude Modulation) signal instead of driving the motor using the PWM signal.

The pieces of processing in the embodiments may be performed by either software or a hardware circuit. A program that executes the pieces of processing in the embodiments can be provided, or the program may be provided to the user while recorded in a recording medium such as a CD-ROM, a flexible disk, a hard disk, a ROM, a RAM, and a memory card. The program is executed by a computer such as a CPU. The program may be downloaded to the apparatus through a communication line such as the Internet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a motor for driving said image forming apparatus;
   a controller for controlling said motor; and
   a sensor configured to sense a device state,
   wherein said motor includes a motor-side controller comprising:
   a pulse generating unit for generating a first pulse signal string having a frequency corresponding to a number of rotations of said motor;
   a first input receiving unit for receiving an input of a logical state of said sensor, said logical state representing the device state that is not the number of rotations of said motor driving said image forming apparatus;
   a superimposing unit for superimposing said logical state of said sensor on said first pulse signal string, which is generated by said pulse generating unit, by modulating a duty ratio of said first pulse signal string generated by said pulse generating unit based on the logical state of said sensor; and
   a signal outputting unit for outputting a second pulse signal string superimposed by said superimposing unit to the controller, wherein the second pulse signal string is the first pulse signal string modulated by said superimposing unit so that the frequency of the second pulse signal string corresponds to the number of rotations of said motor and the duty ratio of the second pulse string corresponds to the logical state of the sensor, and said controller includes:
a second input receiving unit for receiving an input of the second pulse signal string output from said signal outputting unit; and
a demodulating unit for obtaining the logical state of said sensor by demodulating the second pulse signal string received by said second input receiving unit.

2. The image forming apparatus according to claim 1, wherein said first input receiving unit receives inputs of logical states of a plurality of sensors, and said superimposing unit includes code producing unit for producing one code based on the logical states of said plurality of sensors.

3. The image forming apparatus according to claim 2, wherein said superimposing unit further includes:
a dividing unit for dividing a cycle of the first pulse signal string generated by said pulse generating unit into an arbitrary number of intervals; and
a reflecting unit for reflecting a numerical value of each digit of said one code in a state of a pulse signal in each of said arbitrary number of intervals.

4. The image forming apparatus according to claim 1, wherein said controller further includes rotation-number acquiring unit for acquiring the number of rotations of said motor based on the cycle of the second pulse signal string received by said second input receiving unit.

5. The image forming apparatus according to claim 1, wherein said first input receiving unit receives an input of a logical state of a sensor for performing sensing with said motor being driven and for not performing sensing with said motor being stopped.

6. The image forming apparatus according to claim 1, wherein said first input receiving unit receives an input of a logical state of a sensor for performing sensing with said motor being stopped and for not performing sensing with said motor being driven, and
said signal outputting unit outputs the logical state of the sensor, of which the input is received by said first input receiving unit, with said motor being stopped.

7. The image forming apparatus according to claim 1, wherein said controller further includes cycle detecting unit for detecting a cycle of a pulse constituting the second pulse signal string of which the input is received by said second input receiving unit, and
said demodulating unit obtains the logical state of said sensor from a demodulation result of the second pulse signal string received in past by said second input receiving unit when an amount of change of a pulse cycle detected by said cycle detecting unit with respect to a pulse cycle detected in past by said cycle detecting unit is a predetermined value or more.

8. The image forming apparatus according to claim 1, wherein
said motor-side controller further includes:
a time monitoring unit for monitoring a time necessary to invert the logical state in one cycle of the first pulse signal string generated by said pulse generating unit; and
a logic inverting unit for inverting the logical state of the second pulse signal string output from said signal outputting unit when the time monitored by said time monitoring unit changes equal to or more than a predetermined time with respect to a time monitored in a preceding cycle by said time monitoring unit.

9. The image forming apparatus according to claim 1, wherein said controller further includes pulse outputting unit for outputting a third pulse signal string to drive said motor to said motor based on the pulse signal string received by said second input receiving unit.

10. The image forming apparatus according to claim 9, wherein said superimposing unit superimposes the logical state of said sensor using cycle edge timing of the third pulse signal string output from said pulse outputting unit.

11. The image forming apparatus according to claim 9, wherein said controller further includes braking unit for braking the motor that is driven by the third pulse signal string output from said pulse outputting unit, and
said signal outputting unit outputs a logical state of a sensor of which an input is received by said first input receiving unit when said braking unit brakes the motor.

12. The image forming apparatus of claim 1, wherein the first input receiving unit of the motor-side controller that receives the input of the logical state of the sensor is directly connected to the sensor.

13. A method for controlling an image forming apparatus including a motor for driving the image forming apparatus, a controller for controlling said motor, and a sensor configured to sense a device state, the image forming apparatus controlling method comprising:
a pulse signal generating step of generating a first pulse signal string having a frequency corresponding to a number of rotations of said motor;
a first input receiving step of receiving an input of a logical state of said sensor, said logical state representing the device state that is not the number of rotations of said motor driving said image forming apparatus;
a superimposing step of superimposing the first pulse signal string, which is generated in said pulse generating step, on the logical state of said sensor by modulating a duty ratio of the first pulse signal string generated in said pulse generating step based on the logical state of said sensor;
a signal outputting step of outputting a second pulse signal string superimposed in said superimposing step from said motor, wherein the second pulse signal string is the first pulse signal string modulated in said superimposing step so that the frequency of the second pulse signal string corresponds to the number of rotations of said motor and the duty ratio of the second pulse string corresponds to the logical state of the sensor;
a second input receiving step of receiving an input of the second pulse signal string output by said controller in said signal outputting step; and
a demodulating step of obtaining the logical state of said sensor by demodulating the second pulse signal string received in said second input receiving step.

14. The image forming apparatus controlling method according to claim 13, wherein inputs of logical states of a plurality of sensors are received in said first input receiving step, and
said superimposing step includes a code producing step of producing one code based on the logical states of said plurality of sensors.

15. The image forming apparatus controlling method according to claim 14, wherein said superimposing step further includes the steps of:
a dividing step of dividing a cycle of said first pulse signal string generated in said pulse generating step into an arbitrary number of intervals; and
a reflecting step of reflecting a numerical value of each digit of said one code in a state of a pulse signal in each of said arbitrary number of intervals.

16. The image forming apparatus controlling method according to claim 13, further comprising a rotation-number acquiring step of acquiring the number of rotations of said motor based on the cycle of the second pulse signal string received in said second input receiving step.

17. The image forming apparatus controlling method according to claim 13, wherein an input of a logical state of a sensor for performing sensing with said motor being driven and for not performing sensing with said motor being stopped is received in said first input receiving step.

18. A nontransitory computer-readable recording medium storing a control program for an image forming apparatus, said image forming apparatus including a motor for driving said image forming apparatus, a controller for controlling said motor, and a sensor configured to sense a device state, the program causing a computer to execute processing comprising the steps of:
- a pulse generating step of generating a first pulse signal string having a frequency corresponding to a number of rotations of said motor;
- a first input receiving step of receiving an input of a logical state of said sensor, said logical state representing the device state that is not the number of rotations of said motor driving said image forming apparatus;
- a superimposing step of superimposing the first pulse signal string, which is generated in said pulse generating step, on the logical state of said sensor by modulating a duty ratio of the first pulse signal string generated in said pulse generating step based on the logical state of said sensor;
- a signal outputting step of outputting a second pulse signal string superimposed in said superimposing step, wherein the second pulse signal string is the first pulse signal string modulated in said superimposing step so that the frequency of the second pulse signal string corresponds to the number of rotations of said motor and the duty ratio of the second pulse string corresponds to the logical state of the sensor;
- a second input receiving step of receiving an input of the second pulse signal string output by said controller in said signal outputting step; and
- a demodulating step of obtaining the logical state of said sensor by demodulating the second pulse signal string received in said second input receiving step.

19. The recording medium according to claim 18, wherein inputs of logical states of a plurality of sensors are received in said first input receiving step, and
said superimposing step includes a code producing step of producing one code based on said logical states of said plurality of sensors.

20. The recording medium according to claim 19, wherein said superimposing step further includes the steps of:
- a dividing step of dividing a cycle of the first pulse signal string generated in said pulse generating step into an arbitrary number of intervals; and
- a reflecting step of reflecting a numerical value of each digit of said one code in a state of a pulse signal in each of said arbitrary number of intervals.

21. The recording medium according to claim 18, further comprising a rotation-number acquiring step of acquiring the number of rotations of said motor based on the cycle of the second pulse signal string received in said second input receiving step.

* * * * *